D. Holmes & J. Harris, Jr.

Carpet Cleaner,

No. 1,307.

Reissued May 13, 1862.

N. PETERS, PHOTO-LITHOGRAPHER, WASHINGTON, D. C.

UNITED STATES PATENT OFFICE.

DANIEL HOLMES, OF CHELSEA, MASSACHUSETTS, ASSIGNEE OF JOSEPH HARRIS, JR., AND DANIEL HOLMES.

IMPROVED CARPET-BEATING MACHINE.

Specification forming part of Letters Patent No. 19,465, dated February 23, 1858; Reissue No. 1,307, dated May 13, 1862.

*To all whom it may concern:*

Be it known that I, DANIEL HOLMES, of Chelsea, in the Commonwealth of Massachusetts, jointly with JOSEPH HARRIS, Jr., of Roxbury, in said Commonwealth, who has assigned to me his entire interest in the invention hereinafter described, have invented certain new and useful Improvements in Carpet-Beating Machines; and I, the said HOLMES, do hereby declare that the following is a full, clear, and exact description thereof, reference being had to the accompanying drawings, making a part of this specification.

Figure 1:
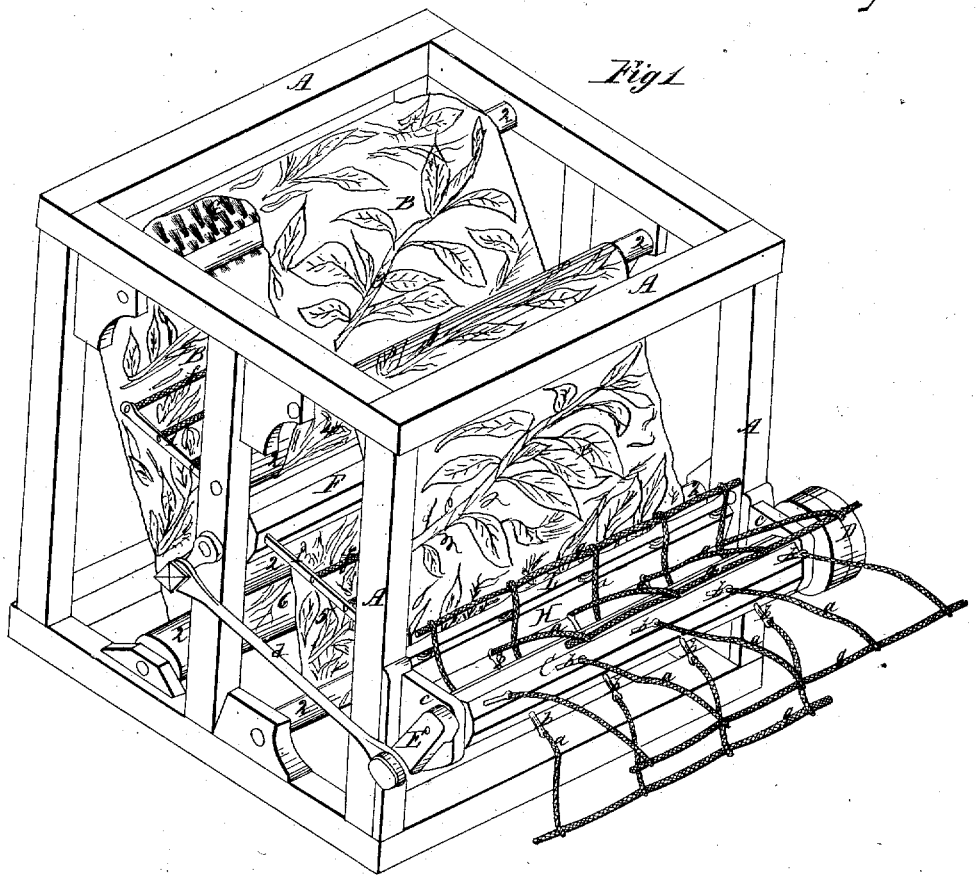
Figure 2:
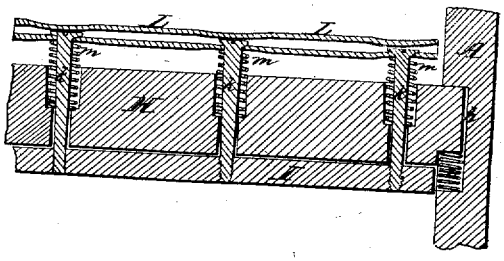

Figure 1 is a perspective view of the machine. Fig. 2 is an elastic cushion, to be referred to hereinafter.

The invention which is the subject of this patent is particularly designed to expel the dust and dirt from carpets by causing the carpet to be whipped by two sets of flexible beaters acting upon opposite sides of the carpet simultaneously, and so arranged that every part of the carpet, both transversely and in the direction of its length, shall be thoroughly beaten.

A is the frame of the machine, in which are hung suitable rollers, 2 2, over which the carpet B to be beaten and cleaned is distended. The width of the machine shall be sufficient to take in carpets of the ordinary size—say from eighteen to twenty-two feet—though the principle of the machine is the same for all sizes. At the front of the machine is placed a shaft, C, fitted to turn in suitable bearings, *c c*, and to which a rotary motion is imparted by means of a belt acting upon the pulley D, attached to one extremity of the shaft. From the surface of the shaft a number of pins, *b b b*, project, which are arranged in rows and are used as the handles of the whips, presently to be described, the pins of each succeeding row occupying intermediate positions on the shaft to those of the preceding row, for the purpose of more equally distributing the blows upon the carpet. The whips or beaters consist of flexible cords *a a a* of about one-half an inch in diameter, one end of each of which is attached to one of the pins *b* and the other end to a connecting-cord, *g*, as shown, thus forming an endless flexible whip, which can inflict a blow both longitudinally and transversely.

Upon the end of the shaft C opposite to that where the driving-pulley is located is a crank, E, by which, through the aid of the connecting-rod *d*, a rapid vibratory motion is imparted to a shaft, F, supported in bearings upon the middle upright of the frame. From this shaft in opposite directions extend the radial arms 1 1, connecting which, in a direction parallel to the shaft, are stretched the flexible cords *f f*. From the position of the shaft F it is evident that the beaters *f f* will act upon the under side of the carpet at the same time that the revolving whips are beating the upper side. Revolving brushes driven by bands from the pulley D are placed at proper intervals and in proper positions to brush both surfaces of the carpet, (one of them being shown at G, where the carpet is broken away to show it.)

In order to diminish the wear of the whips *a g* which strike the carpet as it is passing over the lower roller, 2, as well as also to prevent injury to the carpet, there is placed across the machine in front of the roller 2 a beam, 4, Fig. 2, which extends from post to post of the frame, and is capable of being moved up or down in the grooves *h*, cut in the frame. Each end of the beam is supported by springs *i i*. Long rods K, with a screw-thread cut upon their ends, pass through the beam H and screw into the strip I beneath the beam. Around each rod is placed a light spiral spring, *m*, the hole in the beam H being enlarged near the top sufficiently to receive it. Across the top of the rods K, and connecting them, is placed a cushion or tube, L, as shown in Fig. 2, of gutta-percha, or other yielding material, so that a compound elastic bed is thus formed to receive the blow from the whips.

The invention herein described is not to be understood as limited to the precise construction and arrangement of the several parts as shown, but it is intended to cover all variations of form, structure, or arrangement involving the same mode of operation by equivalent means.

What I claim as the invention of myself and the said JOSEPH HARRIS, Jr., and desire to secure by Letters Patent, is—

1. The use of the revolving endless flexible beaters *a a g g*, or their equivalents, when used and operated substantially as described, for the purposes specified.

2. The combination of a set of vibrating flexible whips, or their equivalents, with a set or sets of revolving endless whips, substantially as described, for the purposes specified.

3. The use of an elastic cushion, L, placed in front of the carpet to sustain the shock of the whips, substantially as herein set forth.

In witness whereof I have, as one of the inventors of the above-described improvements, and as the assignee of the entire interest of JOSEPH HARRIS, JR., joint inventor with myself, set my hand this 31st day of October, A. D. 1861.

DANIEL HOLMES.

In presence of—
CHAS. S. LINCOLN,
DANIEL H. FITZGIBBON.